Dec. 28, 1943.  H. J. MOTT  2,337,725
EARTH LEVELING DEVICE
Filed March 5, 1942  2 Sheets-Sheet 1
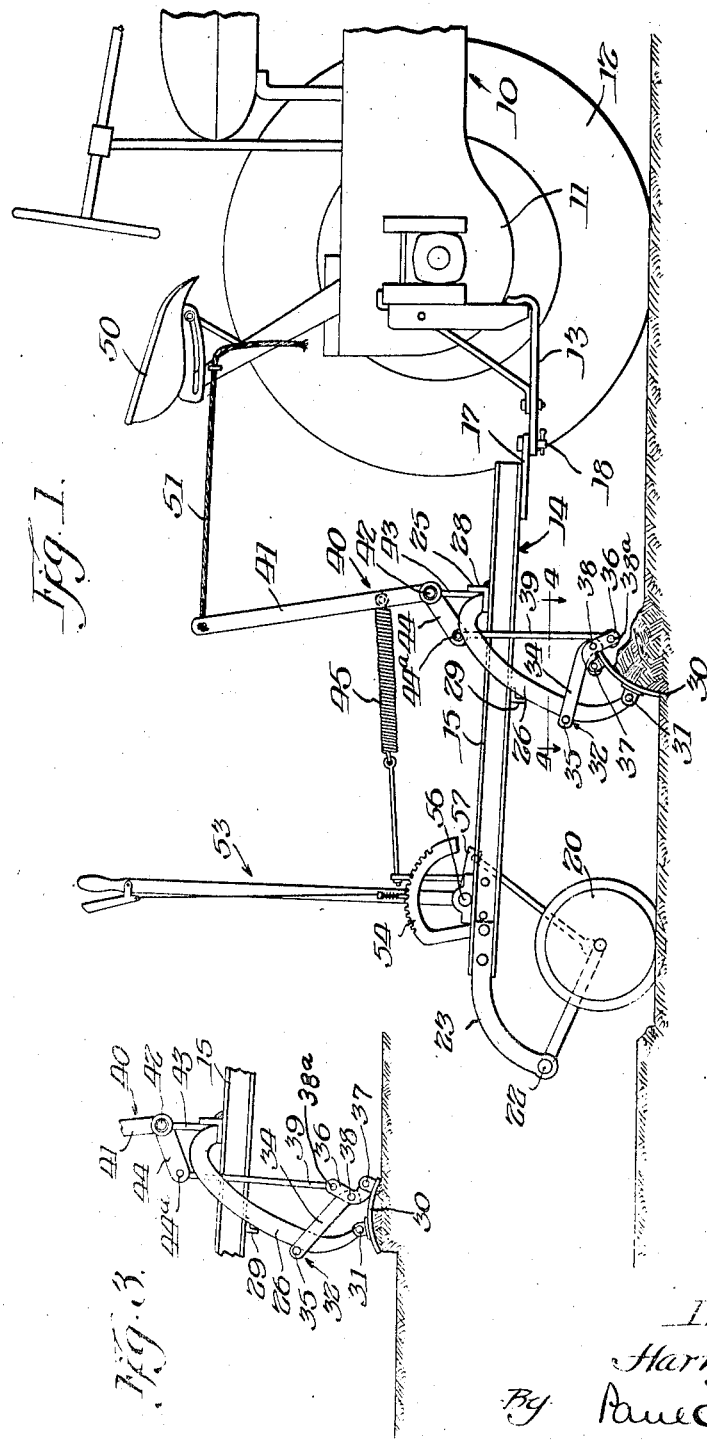

Dec. 28, 1943.　　　　H. J. MOTT　　　　2,337,725
EARTH LEVELING DEVICE
Filed March 5, 1942　　　　2 Sheets-Sheet 2
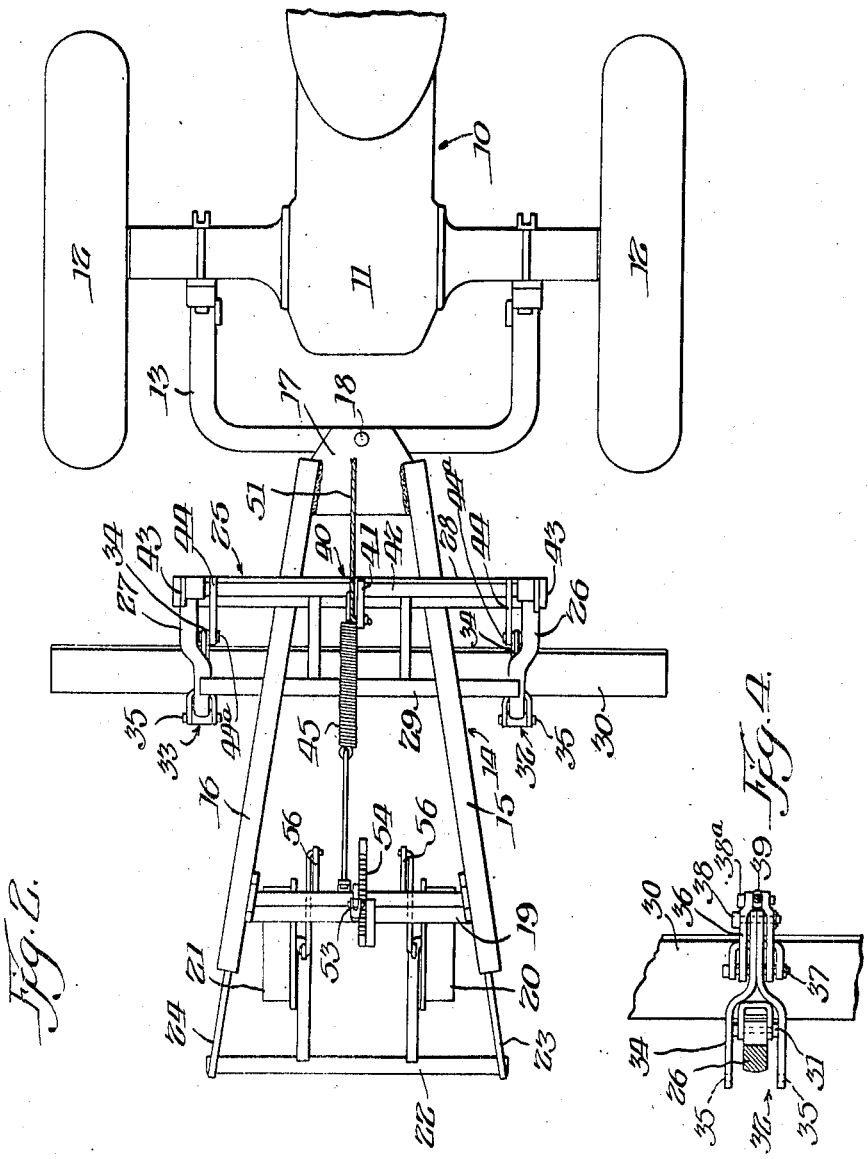

Patented Dec. 28, 1943

2,337,725

UNITED STATES PATENT OFFICE 2,337,725

EARTH-LEVELING DEVICE

Harry J. Mott, Maywood, Ill., assignor to International Harvester Company, a corporation of New Jersey Application March 5, 1942, Serial No. 433,426

9 Claims. (Cl. 37—169)

This invention relates to an earth-working implement and, more particularly, to means for controlling the operation of an earth-leveling tool.

The principal object of this invention is to provide an improved means for moving an earth-leveling tool to and from a ground-working position.

A further object of the invention is to provide an improved means for locking an earth-leveling tool in a ground-working position.

A still further object is to provide an improved type of control for an earth-leveling tool that can be readily regulated from an external source of power such as a tractor.

According to the present invention, a wheeled frame, which may be connected to or carried by a tractor, is provided with an earth-scraping blade that can be moved to and from a ground-working position by a near-center, semilocking mechanism under the control of an operator seated on the tractor.

A more complete understanding of these and other desirable objects and advantages of the invention may be had from the following detailed description taken in conjunction with the accompanying sheets of drawings, in which:

Figure 1 is a side elevational view of a portion of a tractor having an earth-leveling tool connected thereto;

Figure 2 is a plan view of the same tractor and earth-leveling device showing the leveling tool;

Figure 3 is a fragmentary view of the near-center, semilocking mechanism of the leveling device showing the leveling tool out of ground-working position; and Figure 4 is a fragmentary plan view of the near-center, semilocking mechanism taken along the line 4—4 of Figure 1.

Referring now to the drawings, there is shown a tractor generally designated at 10 having a rear body portion 11, ground wheels 12, and a draw-bar 13 connected to and carried by the tractor. Connected to the draw-bar is an earth-leveling device having a frame generally designated at 14 including a pair of horizontally extending frame members 15 and 16. The front portions of the members 15 and 16 are rigidly secured together by a plate 17, through which extends a pivot bolt 18 cooperating with the draw-bar 13, thus pivotally connecting the frame 14 to the tractor 10. The frame members 15 and 16 diverge rearwardly and are connected at their rear ends by a brace member 19. For supporting the frame 14 at its rear, there are provided ground wheels 20 and 21 pivotally connected by a supporting member 22 to brackets 23 and 24, which are connected respectively to the frame members 15 and 16.

A supporting structure 25 is rigidly mounted on the frame and extends transversely thereof. The structure 25 includes a pair of implement supports 26 and 27 which are respectively carried on each side of the frame 14 by an angle member 28 of the supporting structure 25. The supports 26 and 27 extend downwardy of the frame 14 and are braced thereto by a member 29.

A ground-working tool in the form of a scraper blade 30 extends transversely underneath the frame 14 and is pivotally connected to the supports 26 and 27, as shown at 31. The scraper blade 30 is adapted to be moved to or from a ground-working position by causing it to take a vertical or horizontal position with respect to the ground. In its vertical position as best shown in Figure 1, the blade digs into the ground thereby operating to level any uneven surfaces; however, by moving the blade into the horizontal position shown in Figure 3, said blade freely rides over the ground without performing any leveling operation.

Means for moving and locking the blade 30 is provided in the form of a pair of near-center, semilocking mechanisms 32 and 33 respectively connected to the supports 26 and 27. The said near-center, semilocking mechanisms include a link means 34 respectively pivotally connected at 35 to each of the supports 26 and 27. A link means in the shape of a bell-crank 36 is pivotally connected at one end to the scraper blade as shown at 37, said bell-crank also having a pivotal point of connection at substantially its center to the link means 34, as shown at 38. Pivotally connected at the other end of the bell-crank 36, as shown at 38a, is a link 39 which extends vertically and is connected to an operating means generally designated at 40.

The operating means 40 includes a lever 41 which is pivotally connected to the frame 14 by means of a shaft 42 carried in bearing brackets 43 suitably connected to the angle member 28. A pair of crank arms 44 rigidly connected to the shaft 42 are pivotally connected at their ends to the links 39 as shown at 44a to cause movement of the near-center, semilocking mechanism upon actuating the lever 41.

As shown in Figure 1, the blade 30 is practicably locked in its ground-working or vertical position. This is partly because of the mechanical advantage afforded the spring 45 over the earth reactive force applied to the lower edge of the blade 30 when the latter is in its vertical position. Double amplification of the spring force is incurred. The first amplification occurs in the bell-crank 36, since the leg upon which the spring exerts force through the link 39 is longer than the leg to which the blade 30 is connected at 37, and the second amplification occurs in the blade itself, since the pivotal connection 37 is spaced more distantly from the fixed pivotal anchorage 31 than the lower edge of the blade where the earth reactive force is applied. The Figure 1 position of the operating linkage for the blade 30 is also a near-center position in the respect that the pivot 37 is but a short distance below a point (not shown) at the point of tangency of a line extending through pivots 35 and 38 and tangential to an arc described about the fixed pivot 31. If the pivot 31 were at such point (not shown) the blade would be locked against pivotal movement by the ground reactive force since clockwise revolving tendencies of the pivot 37 about the fixed pivot 31 would incur no up or down force component to the pivot 38 that would tend to rotate the link 34, and said link would prevent forward displacement of the pivot 38. It follows since the pivot 37 is adjacent to a near-center position at said point (not shown) at which the blade would be locked that a force applied to the lower edge of the blade for pivoting the same would be at a great mechanical disadvantage so that a relatively small force is effective to prevent rotation of the bell-crank and upward displacement of the link 39.

To move the blade 30 from its ground-working position into a position as shown in Figure 3, the lever 41 is rotated in a clockwise direction causing the link 39 to lift the end of the bell-crank 36, thus moving the point of connection 38 away from the center of an imaginary straight line passed through the points of connection 39a and 44a, and lowering the blade 30 to a position somewhat above that illustrated in Figure 3 and in which position the pivot 38 is sufficiently below a straight line intersecting the pivots 31 and 38ᵃ that upon release of the lever 41, so the spring 45 is operable to urge the link 39 downwardly and the bell-crank 36 clockwise, the momentum of the blade and parts movable therewith or an earth reactive force acting backwardly upon the lower edge thereof will be adequate to prevent such clockwise movement of the bell-crank and in fact cause counter-clockwise movement thereof so the spring-pressed downward movement of the rod 39 ultimately augments the force of the aforesaid momentum and/or said earth reactive force in prostrating the blade. Meanwhile, of course, the lever 41 and the arm 44 are returned to the position of Figure 3 under the force of the spring 45.

To return the blade 30 to its vertical position, the lever 41 is rotated in a clockwise direction. The lifting link 39 will move the blade 30 and the pivot 37 thereon in a rearward counter-clockwise direction about the fixed pivot 31 while the point of connection 38 is moved forwardly and upwardly upon an arcuate path generated about the fixed pivot 35. This upward and rearward movement of the pivot 37 together with upward and forward movement of the pivot 38 causes the bell-crank 36 to pivot clockwise and the upwardly pulled pivot 38ᵃ to be projected forwardly to lengthen the effective lever arm from the pivot 38 upon which the link 39 operates, wherefore after the momentum of the blade and the parts movable therewith has carried the pivot 37 beyond a point predeterminedly upwardly with respect to a line extending between the fixed pivot 31 and the swingable pivot 38, a reversal of force downwardly through the link 39 by the spring 45, upon release of the lever 41, will cause clockwise pivotal movement of the bell-crank 36 about the pivot 38 for reestablishing the upright operating position of the blade.

The advantage of this near-center, semilocking link mechanism is that a comparatively small amount of pressure from the spring 45 is sufficient to keep the blade 30 in its ground-working position despite normal pressure on said blade and yet to yield to permit backward displacement of the lower edge of the blade should it encounter an immovable obstacle during the working operation.

An operator seated on an operator's station 50 on the tractor 10 can actuate the near-center, semilocking link mechanisms 25 by merely pulling a cord 51 extending within easy reach of the operator and connected at one end to the lever 41.

The ground-working depth of the blade 30 is adjusted by means of a lever 53 which moves about a quadrant member 54, said member being rigidly secured to the brace member 19. The lever 53 is rigidly connected to a shaft 55 which is rotatably mounted on the frame 14, said shaft having crank arm portions 56. A pair of links 57 is respectively connected at one end to the crank arm portions 56 and is also respectively connected to the wheels 20 and 21. By moving the lever 53, the wheels 20 and 21 are vertically moved, thus raising and lowering the frame 14 and the scraper blade 30.

It is, of course, understood that various changes and modifications may be made in the specific form of the invention shown and described without departing from the spirit and scope of the invention as defined in the appended claims.

What is claimed is:

1. In combination, a frame, ground wheels supporting said frame, a ground scraper blade extending transversely underneath the frame, supports carried on the frame, means for pivotally connecting the scraper blade to the supports, means for moving the scraper blade from and into a ground-working position including a first link means pivotally connected respectively to each of the supports, a second link means pivotally connected at its center to the end of the first link means and pivotally connected at one end to the scraper blade, said second link means being adapted to be moved to and from a near-center semilocking position for moving the blade to and from a ground-working position, a manually operable lever pivotally mounted on the frame and connected to the other end of said second link means for moving the second link means into and out of its near-center semilocking position, and adjusting means carried on the frame and connected to the ground wheels for moving the frame and regulating the ground-working depth of the scraper blade.

2. In combination, a vehicle frame, a ground-scraper blade extending transversely underneath said frame, a plurality of supports carried on the frame and pivotally connecting the scraper blade to the frame, means for moving the scraper blade from and into a ground-working position including a first link means pivotally connected respectively to the supports, a second link means pivotally connected at its center to the first link means and pivotally connected at one end to the scraper blade, said second link means being adapted to be moved to and from a near-center semilocking position for moving the blade to and from said ground-working position, and a lever pivotally mounted on the frame and connected to the other end of the second link means for moving the second link to and from its near-center semilocking position.

3. In combination, a frame, ground wheels supporting said frame, a ground-scraper blade extending transversely underneath the frame, supports carried on the frame, means for pivotally connecting the scraper blade to the supports, means for moving the scraper blade from and into a ground-working position including a first link means pivotally connected respectively to each of the supports, a second link means pivotally connected at its center to the end of the first link means and pivotally connected at one end to the scraper blade, said second link means being adapted to be moved to and from a near-center position for moving the blade to and from a ground-working position, a manually operable lever pivotally mounted on the frame and connected to the other end of the second link means for moving the second link into and out of its near-center position, and resilient means connected to the frame and to the lever for resisting movement of the second link means from its near-center position.

4. In combination, a frame having a plurality of supporting members mounted thereon, a ground-working tool pivotally connected to the supporting members and adapted to be moved to and from a ground-working position, a first link means connected respectively to the supporting members, a second link means pivotally connected at substantially its center to the first link means and pivotally connected at one free end to the tool, and an actuating member connected to the frame and pivotally connected to the other free end of the second link means for moving the ends of said second link means to near-center position for locking the tool in its ground-working position.

5. In combination, a frame having a plurality of supporting members mounted thereon, a ground-working tool extending transversely underneath the frame, said tool being pivotally connected to the supports for movement to and from a ground-working position, a first link connected respectively to the supporting members, a second link pivotally connected at substantially its center to the first link and pivotally connected at one free end to the tool, and an actuating member connected to the frame and pivotally connected to the other free end of the second link for moving the ends of said second link to a near-center position for locking the tool in its ground-working position.

6. In combination, a frame, supporting means depending from said frame, a working tool extending transversely underneath the frame and pivotally connected to the support means for movement to and from a ground-working position, and a linkage comprising a link pivotally connected to the supporting means, a bell-crank pivotally connected at its leg junction to said link and connected at one end to the working tool, said bell-crank being pivotal about the connection with said link to move the tool into its ground-working position incident to placing the linkage in a near-center condition wherein a relatively small force applied to the other end of the bell-crank will be effective for precluding retraction of the linkage from such condition and hence of the tool from such position in opposition to a force applied to the tool from the ground, and an actuating member mounted on the frame and pivotally connected to the other end of the bell-crank for pivoting said crank to cause movement of the tool to or from its ground-working position.

7. In combination, a frame having a plurality of supporting members mounted thereon, a working tool extending underneath the frame and connected to the supports, said tool being adapted to be moved to and from a ground-working position, a link means connected respectively to the supports, a bell-crank pivotally connected to each link means near its leg junction and connected at one end to the working tool, an actuating member mounted on the frame and pivotally connected to the other end of the bell-crank for moving said crank to cause movement of the tool to and from its working position, and resilient means connected to the frame and to the actuating member for holding the tool in or out of its ground-working position.

8. In combination, a frame having a plurality of supporting members mounted thereon, a working tool connected to the supports for movement to and from a ground-working position, a link means connected respectively to the supports, a bell-crank pivotally connected near its leg junction to each link means and connected at one end to the working tool, and a member connected to the frame and to the other end of the bell-crank, said member being adapted to be moved in one direction for moving the bell-crank to cause movement of the tool to its ground-working position, said member also being adapted to be moved in the same direction for moving the bell-crank to cause movement of the tool from its ground-working position.

9. In combination, a frame, supporting means depending from said frame, a ground-working tool pivotally connected to said supporting means and adapted to be moved to and from a ground-working position, means for pivotally moving the tool including a first link means pivotally connected to the supporting means, a second link means having a pivotal point of connection with the first link means and being pivotally connected to the working tool, a lifting link having a point of connection to the second link means, and a lever connected to the lifting link and adapted to actuate said lifting link to move the pivotal point of connection of the second link means with the tool into a position substantially near an imaginary straight line passed through the point of connection of the first link means to the supporting means and through the point of connection of the first link means to the second link means, thereby semilocking the ground-working tool in one position.

HARRY J. MOTT.